United States Patent
Wang

(10) Patent No.: US 9,958,696 B2
(45) Date of Patent: May 1, 2018

(54) STEREO DISPLAY DEVICE AND METHOD MANUFACTURING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventor: Mengjie Wang, Beijing (CN)

(73) Assignees: BOE TECHNOLOGY GROUP CO., LTD. (CN); BEIJING BOE DISPLAY TECHNOLOGY CO., LTD. (CN)

( * ) Notice: Subject to any disclaimer, the term of this patent is extended or adjusted under 35 U.S.C. 154(b) by 310 days.

(21) Appl. No.: 14/381,786

(22) PCT Filed: Dec. 6, 2013

(86) PCT No.: PCT/CN2013/088732
§ 371 (c)(1),
(2) Date: Aug. 28, 2014

(87) PCT Pub. No.: WO2015/014063
PCT Pub. Date: Feb. 5, 2015

(65) Prior Publication Data
US 2016/0299348 A1    Oct. 13, 2016

(30) Foreign Application Priority Data

Jul. 30, 2013   (CN) .......................... 2013 1 0325047

(51) Int. Cl.
*G02B 27/26* (2006.01)
*G02F 1/1335* (2006.01)
(Continued)

(52) U.S. Cl.
CPC ......... *G02B 27/26* (2013.01); *G02F 1/13363* (2013.01); *G02F 1/13394* (2013.01);
(Continued)

(58) Field of Classification Search
CPC . H04N 13/0409; G02F 1/1347; G02F 1/1333; G02F 1/133325
See application file for complete search history.

(56) References Cited

U.S. PATENT DOCUMENTS 9,316,843 B2 * 4/2016 Ishiguro ............. G02B 27/2264
2008/0030634 A1 * 2/2008 Aramatsu .......... G02B 27/2214
349/15
(Continued)

FOREIGN PATENT DOCUMENTS

CN        1881036      12/2006
CN       101359099      2/2009
(Continued)

OTHER PUBLICATIONS

Office Action in Chinese Patent Application No. 201310325047.0, dated Aug. 24, 2015.
(Continued)

*Primary Examiner* — Dennis Y Kim
(74) *Attorney, Agent, or Firm* — Brooks Kushman P.C.

(57) ABSTRACT

The present invention provides a stereo display device and a method for manufacturing the same. The stereo display device comprises a liquid crystal display unit including a first polarizer, a first substrate, a second substrate, and a liquid crystal layer arranged between the two substrates; and a polarization control unit including a third substrate, a gate line, a protective layer, a first electrode, a spacer, a second electrode and a quarter-wave plate. The second electrode is arranged on the first polarizer. The spacer, the first electrode, the protective layer and the third substrate are sequentially arranged on the second electrode. The gate line is arranged on the third substrate, and the quarter-wave plate is arranged at a side of the third substrate away from the protective layer.

3 Claims, 4 Drawing Sheets

(51) Int. Cl.
*G02F 1/1339* (2006.01)
*G02F 1/1343* (2006.01)
*G02F 1/13363* (2006.01)

(52) U.S. Cl.
CPC .... *G02F 1/13439* (2013.01); *G02F 1/133514* (2013.01); *G02F 1/133528* (2013.01); *G02F 1/134309* (2013.01); *G02F 2001/133638* (2013.01)

(56) References Cited

U.S. PATENT DOCUMENTS

| | | | |
|---|---|---|---|
| 2012/0140142 A1 | 6/2012 | Lee | |
| 2012/0147281 A1* | 6/2012 | Matsuhiro | G02B 27/26 349/15 |
| 2012/0154698 A1* | 6/2012 | Matsuhiro | G02B 27/26 349/15 |
| 2012/0268671 A1* | 10/2012 | Inoue | G02B 27/2214 349/15 |
| 2012/0300142 A1* | 11/2012 | Kim | G02B 27/2214 349/15 |
| 2013/0088655 A1 | 4/2013 | Robinson et al. | |
| 2013/0300958 A1* | 11/2013 | Matsuhiro | G02B 27/26 349/15 |
| 2014/0118673 A1* | 5/2014 | Park | G02F 1/133345 349/138 |

FOREIGN PATENT DOCUMENTS

| | | |
|---|---|---|
| CN | 102116963 | 7/2011 |
| CN | 102213865 A | 10/2011 |
| CN | 102768460 | 11/2012 |
| CN | 102955321 | 3/2013 |
| CN | 202854459 | 4/2013 |
| CN | 103399412 | 11/2013 |

OTHER PUBLICATIONS

Text of the Notification of the First Office Action, App. No. 2013103250470, dated Jan. 5, 2015.
Second Office Action issued in corresponding Chinese Application No. 2013103250470 dated Apr. 13, 2015.
International Search Report and Written Opinion issued in corresponding International Application No. PCT/CN2013/088732 dated Apr. 21, 2014.

* cited by examiner

US 9,958,696 B2

1

STEREO DISPLAY DEVICE AND METHOD MANUFACTURING THE SAME

CROSS-REFERENCE TO RELATED APPLICATION

This application is the U.S. national phase of PCT Application No. PCT/CN2013/088732 filed on Dec. 6, 2013, which claims priority to Chinese Patent Application No. 201310325047.0 filed on Jul. 30, 2013, the disclosures of which are incorporated in their entirety by reference herein.

TECHNICAL FIELD

The present invention relates to the field of display technology, in particular to a stereo display device and a method manufacturing the same.

BACKGROUND

Along with the development of technologies, various display modes have already been developed for a stereo display technology, so as to provide a stereo vision for a viewer. The stereo vision is generated when images at different angles are received by the left and right eyes of the viewer and then synthesized by the brain, so the viewer can sense layers and depth of an object.

As shown in FIG. 1, which is a schematic view showing an existing stereo display device, the stereo display device includes a polarization control unit 100 and a liquid crystal display unit 200. The polarization control unit 100 includes a third substrate 101 and a fourth substrate 110 which is adhered to a first polarizer 201 of the liquid crystal display unit 200 via an adhesive 300. A black matrix 109 is provided on the fourth substrate 110, and a flat layer 106 is provided on the black matrix. The existing stereo display device is formed by adhering a polarization control panel (PCP) cell and a liquid crystal display (LCD) cell, so it is relatively thick and has a thickness approximately double that of a common LCD panel. In addition, because the existing stereo display device is formed by adhering the PCP cell to the LCD cell, the manufacturing process thereof is complex, i.e., it is required to expose, develop, etch and remove a TFT substrate after the TFT substrate is manufactured, which thereby results in high production cost. There is an error during the adhesion of the PCP cell to the LCD cell, so the display effect is adversely affected. Moreover, the PCP cell is adhered and fixed to the LCD cell via the adhesive, and once one of them is defective, the entire stereo display device is defective too, so the discard cost is increased.

SUMMARY

An object of the present invention is to provide a stereo display device and a method for manufacturing the same, so as to solve the problems that an existing stereo display device is thick and there is an error during the adhesion.

In one aspect, the present invention provides a stereo display device, including:
 a liquid crystal display unit including a first polarizer, a first substrate, a second substrate, and a liquid crystal layer arranged between the two substrates, the first polarizer being arranged on a surface of the first substrate away from the liquid crystal layer; and
 a polarization control unit including a third substrate, a gate line, a protective layer, a first electrode, a spacer, a second electrode and a quarter-wave plate, the second

2 electrode being arranged on a surface of the first polarizer away from the first substrate, the spacer, the first electrode, the protective layer and the third substrate being sequentially arranged on a surface of the second electrode away from the first polarizer, the gate line being arranged on the third substrate, and the quarter-wave plate being arranged at a side of the third substrate away from the protective layer.

Alternatively, a flat layer is arranged between the first polarizer and the second electrode.

Alternatively, the first substrate is a color film substrate.

Alternatively, the first substrate and/or the second substrate comprise one of a glass substrate, a quartz substrate and an organic substrate.

In another aspect, the present invention provides a method for manufacturing a stereo display device, including the steps of:
 providing a liquid crystal display unit including a first polarizer, a first substrate, a second substrate and a liquid crystal layer arranged between the two substrates, the first polarizer being arranged on a surface of the first substrate away from the liquid crystal layer;
 forming a second electrode on a surface of the first polarizer away from the first substrate;
 arranging a gate line, a protective layer, a first electrode and a spacer sequentially on a surface of the third substrate;
 mounting the surface of the third substrate on which the spacer is arranged on the first polarizer of the liquid crystal display unit; and
 arranging a quarter-wave plate on another surface of the third substrate.

According to the stereo display device of the present invention, the substrate of the liquid crystal display unit serves as one of the substrates of the polarization control unit, so as to omit the etching of the surrounding black matrix in the polarization control unit, save the raw materials and reduce the cost. Such components as the electrodes are arranged directly outside the substrate of the liquid crystal display unit, so as to save one substrate without using any adhesive, thereby to remarkably reduce the stereo display cost. In addition, in the stereo display device of the present invention, it is unnecessary to adhere the substrates to form a cell, so it is able to reduce the debug time while reducing the adherence tolerance.

DETAILED DESCRIPTION

In order to make the objects, the technical solutions and the advantages of the present invention more apparent, the present invention will be described hereinafter in conjunction with the drawings and the embodiments.

Figure 1:
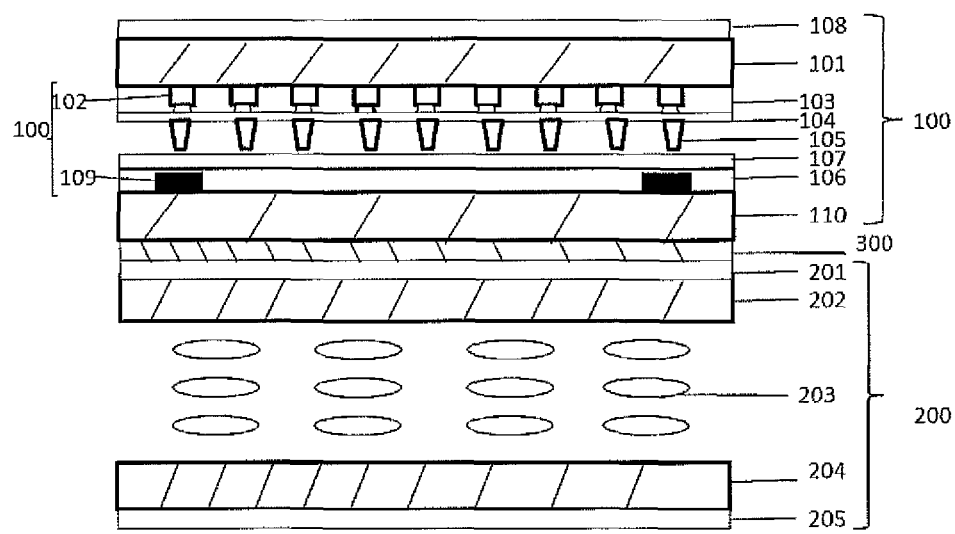
FIG. 1 is a schematic view showing an existing stereo display device.
Figure 2:
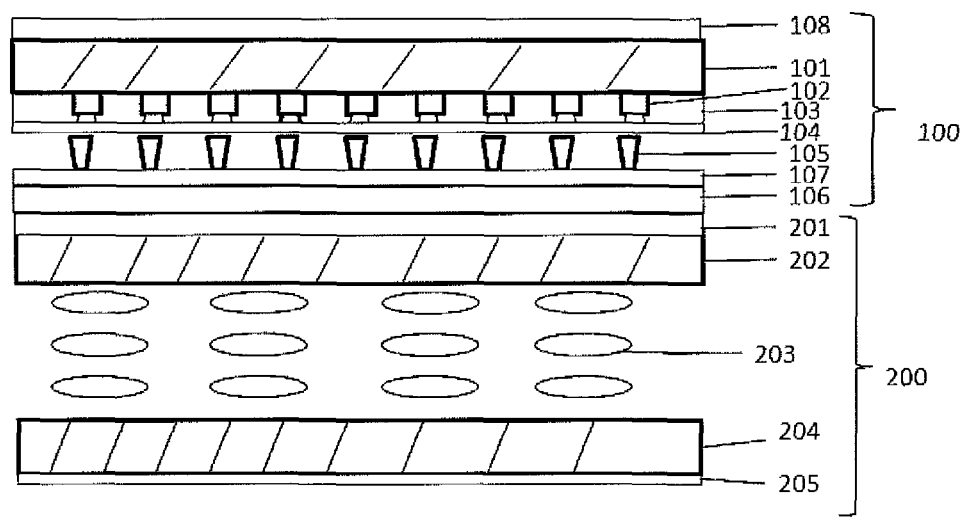
FIG. 2 is a schematic view showing a structure of a stereo display device according to one embodiment of the present invention.

As shown in FIG. 2, which is a schematic view showing a structure of a stereo display device according to one embodiment of the present invention, the stereo display device includes a polarization control unit 100 and a liquid crystal display unit 200. The liquid crystal display unit 200 includes a first substrate 202, a second substrate 204 and a liquid crystal layer 203 arranged between the two substrates. The substrates of the present invention may be selected from one of a glass substrate, a quartz substrate and an organic substrate. Polarizers for generating polarized light are further arranged on and close to the two substrates. Among them, a first polarizer 201 is arranged at a surface of the first substrate 202 away from the liquid crystal layer, and a second polarizer 205 is arranged on the second substrate 204. In order to provide a pretilt angle for liquid crystal molecules, alternatively an orientation layer is arranged between the liquid crystal layer and the substrate. The orientation layer is alternatively made of polyimide (PI). When the pretilt angle is provided to the liquid crystal molecules, it is able to facilitate the rotation of the liquid crystal molecules. Usually, the pretilt angle is in the range of 0 to 2°.

The polarization control unit 100 includes a third substrate 101, a gate line 102, a protective layer 103, a first electrode 104, a spacer 105, a second electrode 107 and a quarter-wave plate 108. The second electrode 107 is arranged on the first polarizer 201. The spacer 105, the first electrode 104, the protective layer 103 and the third substrate 101 are sequentially arranged on the second electrode 107. The gate line 102 is arranged on the third substrate 101, and the quarter-wave plate 108 is arranged at a side of the third substrate 101 away from the protective layer. The first electrode 107 and the second electrode 104 are made of a transparent conductive material, e.g., ITO, by spattering, and they may be of a bar-shape and arranged at a predetermined interval.

An existing liquid crystal display (LCD) may be used as the liquid crystal display unit 200, in which the first substrate is a color film substrate in the LCD. For the LCD, the light is emitted through the color film substrate, so the polarization control unit is arranged at a side of the color film substrate. The color film substrate is provided with a black matrix and via-holes formed by etching, so it is unnecessary to perform such steps as exposing, developing, etching and peeling off at the polarization control unit. OC (a flat layer), with high light transmittance, may be used to repair possible defects at the surface of the polarizer and the surrounding thereof, so a flat layer 106 is alternatively arranged on the first polarizer on the first substrate, so as to provide the first polarizer 201 with a flat surface.

In this embodiment, the spacer 105 is arranged between the first and second electrodes, so as to form an isolation layer. The spacer 105 may be of a columnar or triangular shape, or any other appropriate shapes, and may be made of resin. The gate line 102 is arranged on the third substrate 101, and coupled to the first and second electrodes, respectively, so as to supply control signals to the two electrodes for controlling a light emission state. The quarter-wave plate 108 is arranged at a side of the third substrate 101 away from the electrode, and constituted by a birefringent single-crystal sheet. When the light passes through the quarter-wave plate 108 in a normal direction, a phase difference between the ordinary light (o light) and the extraordinary light (e light) is equal to $\pi/2$ or an odd multiple thereof. When the linearly polarized light enters the quarter-wave plate in a vertical direction, and an angle $\theta$ is formed between the polarized light and an optic axis plane of mica (a vertical, natural cleavage plane), the linearly polarized light is changed to elliptically polarized light after it passes through the quarter-wave plate. When $\theta=45°$, the emergent light is circularly polarized light. The quarter-wave plate is used to achieve 3D display.

According to the stereo display device of the present invention, the substrate of the liquid crystal display unit serves as one of the substrates of the polarization control unit, so as to omit the etching of the surrounding black matrix in the polarization control unit, save the raw materials and reduce the cost. Such components as the electrodes are arranged directly outside the substrate of the liquid crystal display unit, so as to save one substrate without using any adhesive, thereby to remarkably reduce the stereo display cost. In addition, in the stereo display device of the present invention, it is unnecessary to adhere the substrates to form a cell, so it is able to reduce the debug time while reducing the adherence tolerance.

Figure 3:
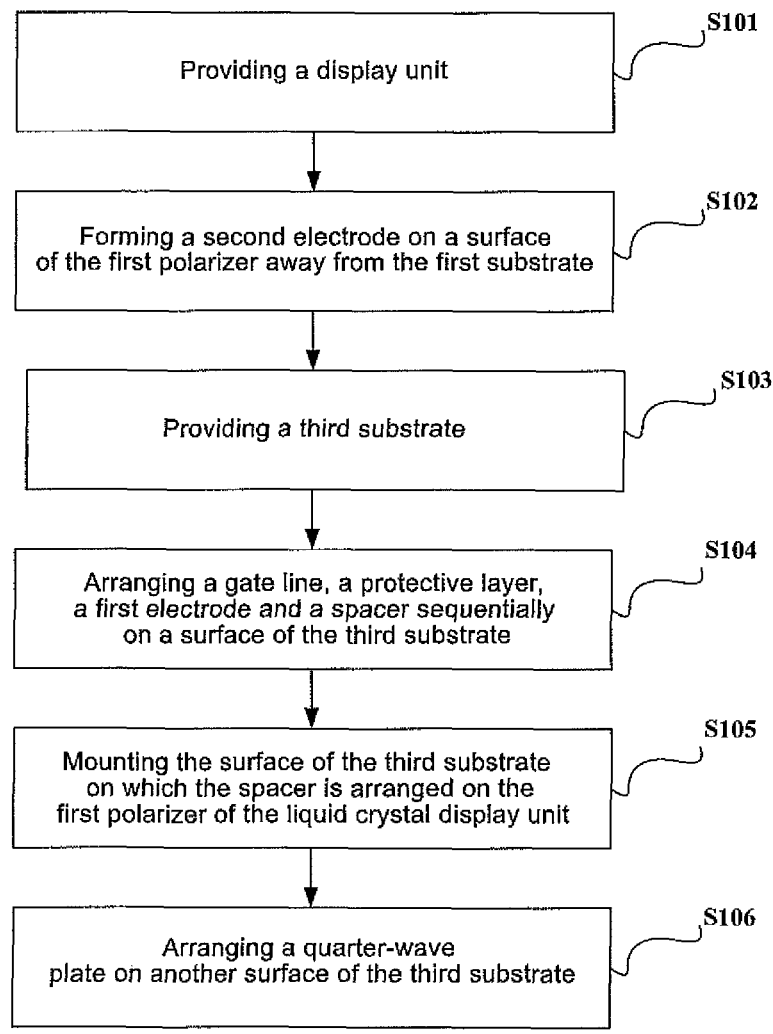
FIG. 3 is a flow chart of a method for manufacturing the stereo display device according to one embodiment of the present invention.

As shown in FIG. 3, which is a flow chart of a method for manufacturing a stereo display device according to one embodiment of the present invention, the method includes the following steps:

Step S101: providing a liquid crystal display unit including a first polarizer, a first substrate, a second substrate and a liquid crystal layer arranged between the two substrates, the first polarizer being arranged on a surface of the first substrate away from the liquid crystal layer;

Step S102: forming a second electrode on a surface of the first polarizer away from the first substrate;

Step S103: providing a third substrate;

Step S104: arranging a gate line, a protective layer, an electrode and a spacer sequentially on a surface of the third substrate;

Step S105: mounting the surface of the third substrate on which the spacer is arranged on the first polarizer of the liquid crystal display unit; and Step S106: arranging a quarter-wave plate on another surface of the third substrate.

According to the method for manufacturing the stereo display device of the present invention, the substrate of the liquid crystal display unit serves as one of the substrates of the polarization control unit, so as to omit the etching of the surrounding black matrix in the polarization control unit, save the raw materials and reduce the cost. Such components as the electrodes are arranged directly outside the substrate of the liquid crystal display unit, so as to save one substrate without using any adhesive, thereby to remarkably reduce the stereo display cost. In addition, in the stereo display device of the present invention, it is unnecessary to adhere the substrates to form a cell, so it is able to reduce the debug time while reducing the adherence tolerance.

The display unit of the present invention may be an existing liquid crystal display, which includes a first substrate, a second substrate and a liquid crystal layer arranged between the two substrates. The display unit further includes polarizers arranged outside the two substrates. To be specific, a first polarizer is arranged at a surface of the first substrate away from the liquid crystal layer, and a second polarizer is arranged on the second substrate. The substrates may be selected from one of a glass substrate, a quartz substrate and an organic substrate. The liquid crystal display is known in the art, so the manufacturing procedure and the structure thereof will not be repeated herein.

In Step S102, the electrodes made of a transparent conductive material, e.g., ITO, are formed on the first substrate by spattering, and they may be of a bar-shape and arranged at a predetermined interval. The first substrate is a color film substrate in the LCD. For the LCD, the light is emitted through the color film substrate, so a polarization control unit is arranged at a side of the color film substrate. The color film substrate is provided with a black matrix and via-holes formed by etching, so it is unnecessary to perform such steps as exposing, developing, etching and peeling off at the polarization control unit.

Alternatively, subsequent to step S102, the method further includes forming a flat layer on the first polarizer on the first substrate, so as to provide the first polarizer with a flat surface.

In Step S103, a third substrate is provided. The third substrate may be selected from one of a glass substrate, a quartz substrate and an organic substrate.

In Step S104, a gate line, a protective layer, an electrode and a spacer are arranged sequentially on a surface of the third substrate. The gate line is arranged on a surface of the third substrate and coupled to the electrodes, so as to supply control signals to the electrodes. The protective layer is arranged on the gate line, the electrodes and the spacer are arranged on the protective layer. The electrodes may be of a bar-shape and arranged at a predetermined interval.

In Step S105, the surface of the third substrate on which the spacer is arranged is mounted on the first polarizer of the liquid crystal display unit, so as to mount the third substrate on the liquid crystal display unit and enable the spacer to face the first substrate of the liquid crystal display unit, thereby to implement the combination of the liquid crystal display unit and the polarization control unit. Due to avoid an adhesive as well as an aligning step, it is able to simplify the operation, reduce the debug time and reduce the adherence tolerance.

In Step S106, the quarter-wave plate is arranged on the other side of the third substrate, and at this time, the stereo display device is obtained.

The method for manufacturing the stereo display device will be described hereinafter in conjunction with the embodiments.

Figure 4:
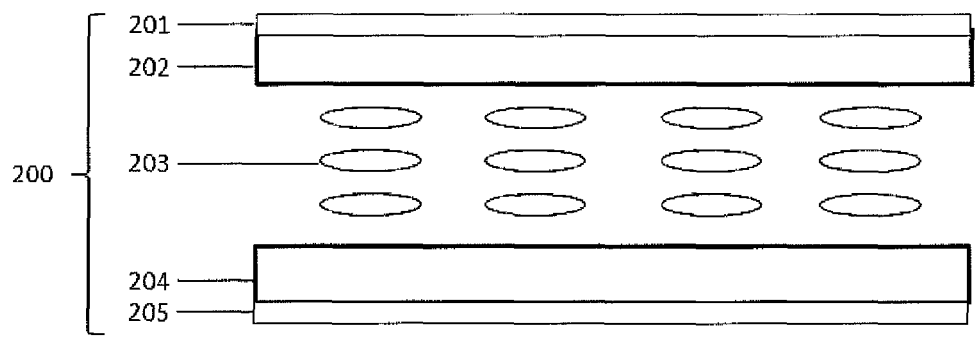
FIG. 4 is a schematic view showing a structure of a liquid crystal display unit according to one embodiment of the present invention.

As shown in FIG. 4, which is a schematic view showing a structure of the liquid crystal display unit according to one embodiment of the present invention, the liquid crystal display unit 200 includes the first substrate 202, the second substrate 204, and the liquid crystal layer 203 arranged between the two substrates. The first polarizer 201 is arranged on the first substrate 202, and the second polarizer 205 is arranged on the second substrate 204. In order to provide a pretilt angle to liquid crystal molecules, alternatively an orientation layer is arranged between the liquid crystal layer and the substrate. The orientation layer may be made of polyimide (PI). When a pretilt angle is provided to the liquid crystal molecules, it is able to facilitate the rotation of the liquid crystal molecules. Usually, the pretilt angle is in the range of 0 to 2°.

Figure 5:
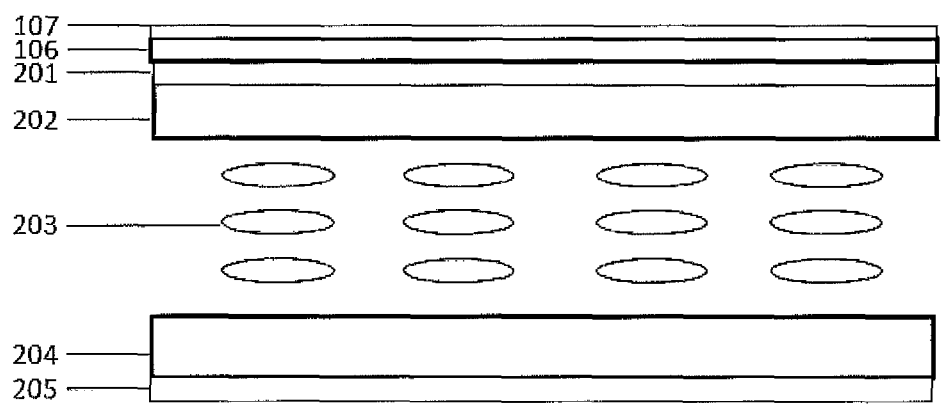
FIG. 5 is a schematic view showing the operation of the liquid crystal display unit according to one embodiment of the present invention.

As shown in FIG. 5, which is a schematic view showing the operation of the liquid crystal display unit according to one embodiment of the present invention, the flat layer 106 is arranged on the first polarizer 201 on the first substrate, so as to provide the first polarizer 201 with a flat surface. Then, the second electrode 107 is formed on the flat layer 106.

Figure 6:
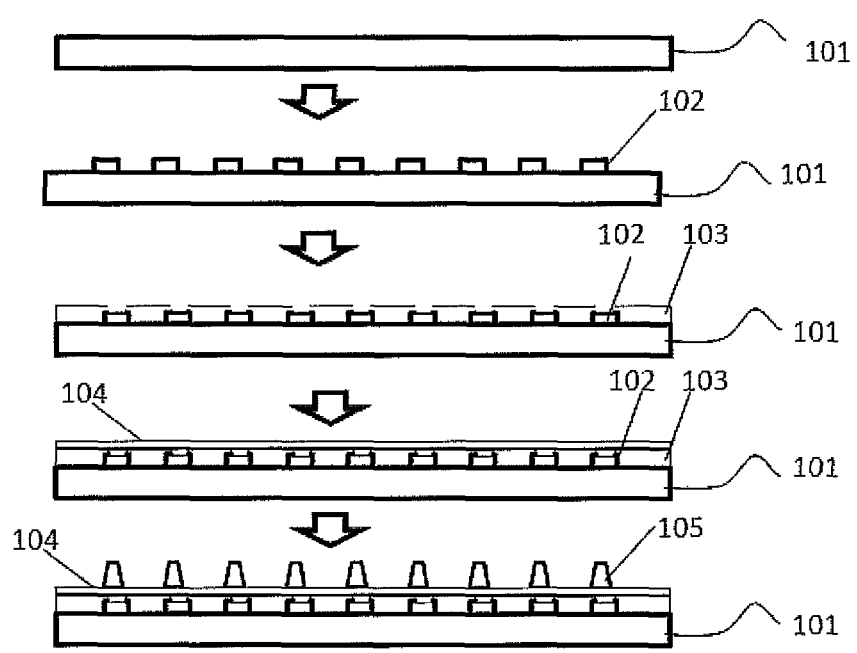
FIG. 6 is a flow chart of a method for manufacturing a polarization control unit according to one embodiment of the present invention.

As shown in FIG. 6, which is a flow chart of a method for manufacturing the polarization control unit according to one embodiment of the present invention, the method includes the following steps:

Step S1: providing the third substrate 101;
Step S2: arranging the gate line 102 on the third substrate 101;
Step S3: arranging the protective layer 103 on the gate line 102;
Step S4: forming the second electrode 104 on the protective layer 103; and
Step S5: arranging the spacer 105 on the second electrode 104.

The polarization control unit is formed on the third substrate through the above five steps. Then, the third substrate is mounted on the liquid crystal display unit in such a manner that the spacer faces the first substrate of the liquid crystal display unit, and the quarter-wave plate 108 is arranged on the other side of the third substrate. At this time, the stereo display device is obtained, the structure of which is shown in FIG. 2.

According to the above, the substrate of the liquid crystal display unit serves as one of the substrates of the polarization control unit, so as to omit the etching of the surrounding black matrix in the polarization control unit, save the raw materials and reduce the cost. Such components as the electrodes are arranged directly outside the substrate of the liquid crystal display unit, so as to save one substrate without using any adhesive, thereby to remarkably reduce the stereo display cost. In addition, in the stereo display device of the present invention, it is unnecessary to adhere the substrates to form a cell, so it is able to reduce the debug time while reducing the adherence tolerance.

The above are merely the preferred embodiments of the present invention. It should be noted that, a person skilled in the art may make further modifications and improvements to the present invention without departing from the principle of the present invention, and these modifications and improvements shall also be considered as the scope of the present invention.

What is claimed is:

1. A method for manufacturing a stereo display device, comprising:
    providing a liquid crystal display unit including a first polarizer, a first substrate, a second substrate and a liquid crystal layer arranged between the two substrates, the first polarizer being arranged on a surface of the first substrate away from the liquid crystal layer;
    arranging a flat layer on a surface of the first polarizer away from the first substrate, with the flat layer directly contacting the surface of the first polarizer away from the first substrate without adhesive between the flat layer and the surface of the first polarizer away from the first substrate, after providing the liquid crystal display unit;
    forming a second electrode on a surface of the flat layer away from the first substrate, with the second electrode directly contacting the flat layer, after arranging the flat layer on the surface of the first polarizer away from the first substrate;
    providing a third substrate, after forming the second electrode on the surface of the flat layer away from the first substrate;
    arranging gate lines, a protective layer, a first electrode and a spacer sequentially on a surface of the third substrate, after providing the third substrate;
    mounting, on the second electrode, the surface of the third substrate on which the spacer is arranged, after arranging the spacer on the surface of the third substrate; and
    arranging a quarter-wave plate on the other surface of the third substrate.

2. The method according to claim 1, wherein the first substrate is a color film substrate.

3. The method according to claim 1, wherein the third substrate comprises one of a glass substrate, a quartz substrate and an organic substrate.

\* \* \* \* \*